Figures 1, 2, 3:
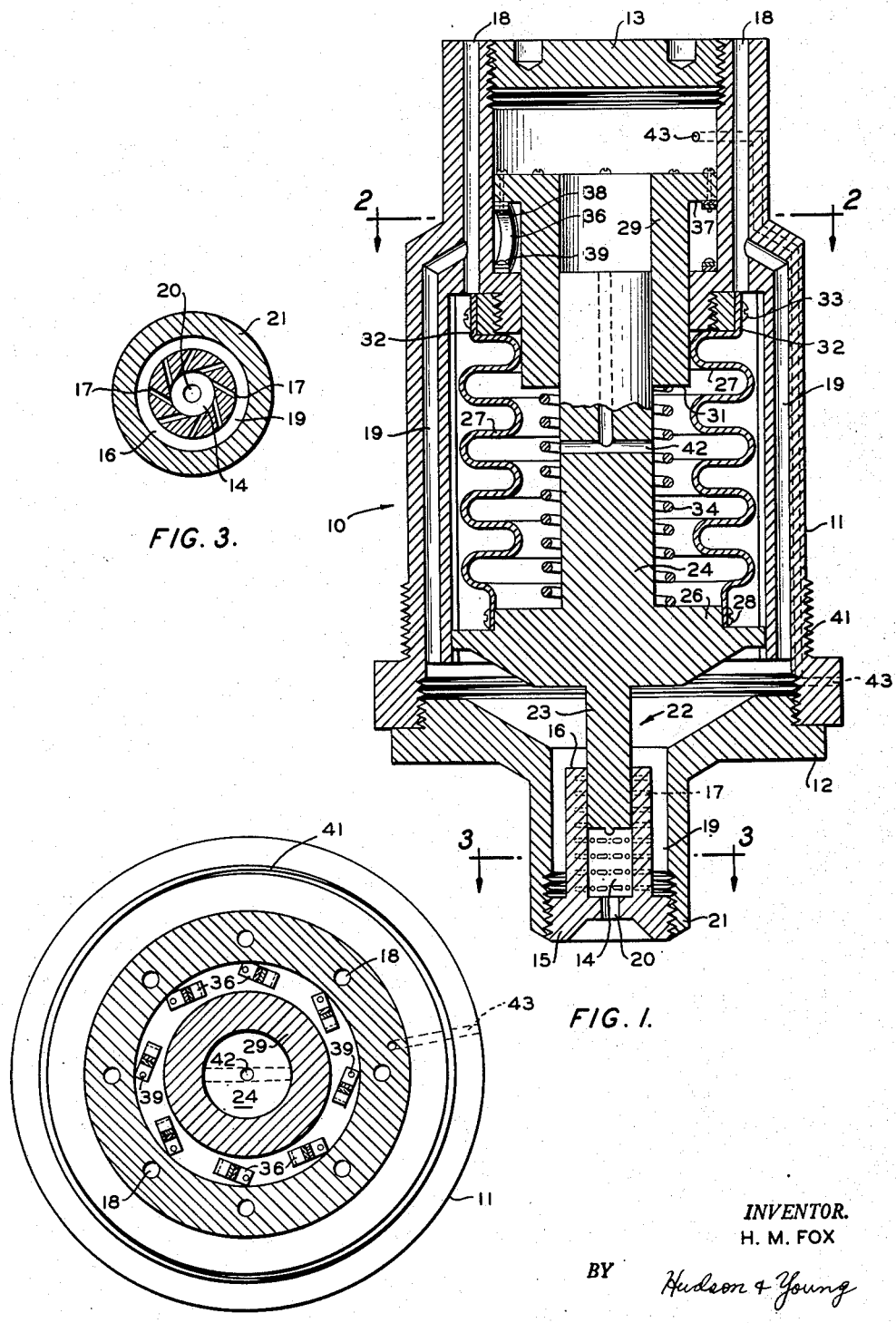

Dec. 25, 1956  H. M. FOX  2,775,484
VISCOSITY COMPENSATING VARIABLE-AREA FUEL NOZZLE
Filed Aug. 31, 1953  2 Sheets-Sheet 1

INVENTOR.
H. M. FOX
BY Hudson & Young
ATTORNEYS

Dec. 25, 1956   H. M. FOX   2,775,484
VISCOSITY COMPENSATING VARIABLE-AREA FUEL NOZZLE
Filed Aug. 31, 1953   2 Sheets-Sheet 2

INVENTOR.
H. M. FOX
BY
Hudson & Young
ATTORNEYS

United States Patent Office

2,775,484
Patented Dec. 25, 1956

2,775,484

VISCOSITY COMPENSATING VARIABLE-AREA FUEL NOZZLE

Homer M. Fox, Bartlesville, Okla., assignor to Phillips Petroleum Company, a corporation of Delaware Application August 31, 1953, Serial No. 377,300

2 Claims. (Cl. 299—118)

This invention relates to the injection of liquid fuels into an internal combustion chamber. In one aspect it relates to an improved variable-area nozzle for the injection of liquid fuel into a gas turbine engine.

In another aspect it relates to a method for maintaining the degree of atomization of fuel substantially constant when the viscosity of the fuel varies. In another aspect it relates to means for communicating the response of a temperature and/or altitude-responsive element to a pressure-sensitive means in a variable-area fuel injection nozzle so as to alter the action of said pressure-sensitive means to increase the pressure drop through the nozzle when fuel temperature decreases and decrease said pressure drop when fuel temperature increases.

This application is a continuation-in-part of my co-pending application, Serial Number 203,994, filed January 2, 1951, now Patent 2,661,243 of December 1, 1953.

Jet engines have only in the last few years been used in large numbers for the purpose of propelling aircraft and they have been found to be highly advantageous for use in high speed planes. With the increase in use of such engines, however, a multitude of operational problems have also come to be recognized.

A jet engine comprises three general parts; first, an air intake section; second, a fuel addition and combustion section; and third, an exhaust section. In a turbojet engine, the air intake section and means for effecting such air intake employs a rotating compressor, such as a turbine compressor, operated by a gas turbine as motivating power for introducing the air into the combustion section. The purpose of operation of such an engine is to burn the fuel and to utilize as much as possible of the heat energy added in producing thrust for the engine. In the gas turbine engine, the combustion gases pass through a turbine which utilizes part of the heat energy in the gas engines in driving the compressor so as to furnish additional air for the combustion zone. The gases then are exhausted to the atmosphere through the exhaust section or tail pipe with a concomitant production of thrust.

Performance of a jet engine is dependent to a large extent upon the "temperature rise" which is obtainable in the particular engine. "Temperature rise" is that increase in temperature between the inlet to the combustor and the temperature of the gases in the combustor exhaust outlet. For each engine speed at a given altitude, a certain temperature rise is required for the operation of any given jet engine. Combustor inlet pressure, fuel atomization, and mass air flow through the engine impose a limitation upon the combustion of any fuel utilized in the operation of the engine. For each combination of fuel atomization, combustor inlet pressure, and mass air flow, there exists for any given fuel a maximum attainable temperature rise which depends upon the combustion stability performance of that fuel under the combination of these conditions. As the operation conditions become more severe, a decrease in combustion stability is encountered. One phenomenon which tends to affect temperature rise in any given engine is known as "cycling." Cycling is an indication of instability of combustion of a given fuel. The flame front within the combustor tends to fluctuate back and forth and many times the instability reaches such a degree that the flame is finally extinguished. The point at which combustion will no longer be sustained is known as the "blow-out" or "cut-out" point. Blow-out is the primary controlling characteristic of jet engine performance since it defines the thrust output limits at a given altitude.

Various types of pressure injection nozzles have been proposed for introducing liquid fuel into a combustion chamber of a jet internal combustion engine. One such injection nozzle is the pressure-type atomizing nozzle for delivering atomized liquid fuel into the chamber, i. e., as a spray of small liquid droplets. One type of pressure-type injection nozzle is known as a fixed-area nozzle of the vortex-type, into which the liquid is introduced through a fixed opening and then discharged into the combustion chamber through a fixed discharge orifice. In the operation of the fixed-area nozzle the fuel inlet pressure, i. e., the pressure at the point of introduction of fuel into the fixed opening, is regulated to permit the requisite quantity of fuel to be passed through the nozzle and to be injected into the engine. However, the combustion stability is dependent on the degree of atomization of fuel ejected from the nozzle which is in turn affected by change in fuel inlet pressure, the degree of atomization apparently being a function of the pressure drop across the fixed opening. The pressure drop across such an opening necessary for delivering large amounts of the fuel is often so high as to cause combustion instability as a result of too high a degree of fuel atomization, sometimes resulting in "blowout," i. e., extinguishment of the flame. On the other hand, that pressure drop necessary for delivering relatively small amounts of liquid fuel is so small as to cause combustion instability as a result of too low a degree of atomization. Under these conditions combustion efficiency is entirely unsatisfactory, and a loss in power is obtained that cannot be tolerated.

More recently a modified or "variable-area" type fuel injection nozzle has been developed. This nozzle has a fixed discharge orifice and differs from the fixed-area type inasmuch as the available area of the set of openings for admitting liquid fuel into the vortex chamber is varied by a pressure sensitive means, in response to fuel inlet pressure, so that a predetermined relatively constant pressure drop is maintained across the openings regardless of the quantity of fuel to be injected into the vortex chamber, thereby providing for a satisfactory degree of fuel atomization under selected operating conditions.

In operating aircraft gas turbine and/or jet engines in flight, temperatures to which the fuel supply are exposed vary extensively, particularly as a function of the change in altitude. These temperature changes are manifest in their relation to fuel viscosity, which varies inversely with temperature. When operating a variable-area fuel injection nozzle of the type described, an increase in liquid fuel viscosity requires a higher fuel pressure for maintaining the requisite pressure drop so as to continue to deliver the needed amount of fuel into the nozzle for injection into the engine. I have found that the variable-area injection nozzle described, in case of an increased fuel viscosity does not satisfactorily permit the necessary increase in pressure drop to take place, but instead provides for more inlet area tending to prevent development of such required increase in pressure drop, as a result of which the pressure drop of the more viscous liquid across the openings is unduly low and atomization of fuel is seriously impaired. Similarly the converse is true with respect to a decrease in viscosity of the fuel.

I have found that the variable-type injection nozzle described above can be utilized quite satisfactorily at a constant or nearly constant fuel viscosity. However, when encountering the broad range of temperatures as described with the concomitant effect on fuel viscosity, the pressure sensitive means prevents the necessary change in fuel pressure to take place that is needed when the fuel viscosity changes. The variable-area nozzle is not adapted to automatically regulate fuel pressure in response to change in fuel viscosity, so as to alter the effect that it (the variable-area nozzle) ordinarily has in responding to change in fuel pressure at a constant or nearly constant fuel viscosity. My invention is concerned with a means for effecting a greater efficiency and engine performance when employing a variable-area fuel injection nozzle of the type described, under conditions of varying liquid fuel viscosity, than has been possible heretofore, and is further concerned with providing improved engine startability.

An object of this invention is to provide for injection of liquid fuel into the combustion chamber of an internal combustion engine. Another object is to provide an improved fuel injection nozzle. Still another object is to provide improved combustion efficiency and engine performance when employing a variable-area fuel injection nozzle, in the operation of a gas turbine engine, or of a jet engine, under conditions of varying liquid fuel viscosity. Still another object is to provide a viscosity compensating variable-area fuel nozzle. Other objects will be apparent to one skilled in the art from the accompanying discussion and disclosure.

According to this invention there is provided a method comprising increasing the pressure drop through a passageway in a fuel injection nozzle of the type described when the fuel viscosity increases and decreasing said pressure drop when said viscosity decreases.

According to one embodiment of the invention, there is provided, in a method for injecting fuel in spray form into a jet engine combustion chamber and varying, in response to variation of fuel pressure, the available area of a passageway through which said fuel is supplied, the improvement comprising decreasing said area when the temperature of the fuel decreases (viscosity increases) and increasing said area when said temperature increases (viscosity decreases).

According to a further embodiment of the invention, the cross-sectional area of a fuel passageway, in a method of the type described, is controlled responsive to variations in altitude, which affects the temperature and therefore the viscosity of the fuel.

In accordance with my invention, I have provided an improved fuel injection nozzle of the variable-area vortex-type affording improved atomization of fuel under conditions of varying fuel viscosity. My invention is further described and illustrated with reference to the attached diagrammatic drawings. It is to be understood that my invention is not to be limited to the drawings but that the drawings can be altered in many respects by those skilled in the art and still remain within the intended scope of my invention.

Figure 4:
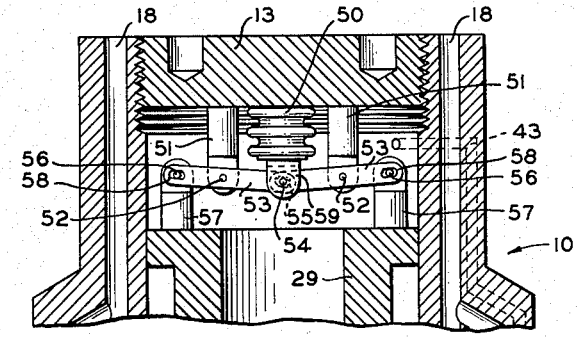
Figure 5:
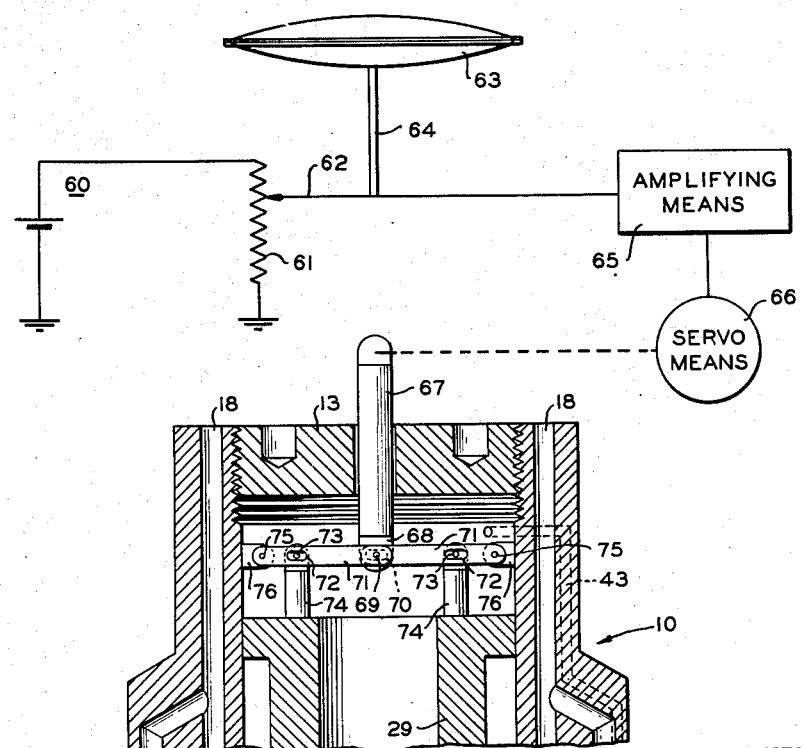

Figure 1 is a cross sectional view of one form of viscosity compensating variable-area fuel nozzle of my invention. Figure 2 is a cut-away view of Figure 1 taken along the line 2—2 particularly illustrative of one system of temperature sensitive means of my invention. Figure 3 is a cut-away drawing of Figure 1 taken along the line 3—3, particularly illustrative of the manner in which fuel inlet conduits are disposed to introduce liquid fuel tangentially into the vortex chamber. Figure 4 is a sectional elevation of another embodiment of this invention. Figure 5 is a sectional elevation of still another embodiment of this invention.

Variable-area fuel nozzle assembly 10, is illustrated with reference to Figure 1. Housing 11 is closed at one end by closure member 12 and at the other end by closure member 13. Vortex chamber 14 in closure member 12 is formed by cylinder 16 containing in its side walls conduits 17 disposed so as to deliver fuel into chamber 14 tangentially against the inner surfaces thereof. Conduits 18 are disposed in the side wall of housing 11 for admitting liquid fuel, and are in communication with conduits 17 via conduits 19. Conduits 19 around chamber 14 comprise an annulus formed by the cylinder 16 and by concentric cylinder member 21 in closure member 12, containing closed end 15 and discharge orifice 20 coaxial with chamber 14. A piston-type valve 22 comprises piston 23 axially disposed in chamber 14 and axially movable therein, and valve stem 24 together with bellows closure member 26 as described hereafter. A pressure sensitive bellows 27 is disposed within housing 11 coaxial with piston 23 and connected at one end with piston 23 via its closure member 26, attached and sealed to member 26 by fastening means 28, so as to prevent communication of the interior of bellows 27 with conduits 18 and 19. Lipped collar-guide 29 is disposed in housing 11, axially with respect to piston 23 and bellows 27, and is adapted by its lipped portion to be guidably supported in a part of housing 11 spaced away from bellows closure 26. Collar guide 29 is further adapted to be moved axially in housing 11, and encompasses stem member 24 so as to guide the movement of valve assembly 22 in an axial direction. The end 31 of collar-guide 29 is encompassed by bellows 27. The end 32 of bellows 27 is secured by fastening means 33 to housing 11 and sealed to prevent communication of the interior of bellows 27 with conduits 18 and 19. Helical spring 34 in bellows 27 is axially disposed therein in contact with end 31 of collar-guide 29 at one end, and at the other end with closure member 26 of bellows 27. Temperature sensitive element 36 is secured to the underside 37 of the lipped portion of collar-guide 29 and to housing 11 by fastening means 38 and 39, respectively. In this manner temperature sensitive element 36 expands or contracts as the case may be in response to any temperature change taking place in conduits 18 and is thereby adapted to cause collar-guide 29 to move in an axial direction, which in turn alters the tension on helical spring 34 resulting ultimately in an adjustment of the position of piston 23 in chamber 14 as described hereafter. Thread means 41 is provided to secure the assembly 10 in the side wall of a combustion chamber. The interior of bellows 27 is maintained in communication with the interior of such a combustion chamber by conduits 42 and 43.

Figure 2 further illustrates the manner in which the fuel inlet conduits 18 are disposed in housing 11 and also serves to illustrate one manner in which temperature sensitive elements 36 are disposed in housing 11.

Figure 3 is further illustrative of the manner in which the fuel inlets 17 are disposed to introduce fuel into vortex chamber 14 in a direction tangent to the inner wall thereof.

Temperature sensitive element 36 can be any suitable temperature sensitive means and is preferably a compound bar-type, generally a bimetallic strip which consists of two sheets of metal, one of relatively high and the other of relatively low coefficient of expansion, laminated by welding, brazing, soldering, or even riveting. Bimetallic strips particularly suitable for use in the practice of my invention include brass-iron, Monel-iron, and the like. The bimetal strip can be used in the form of a coil, spiral, or helical, or preferably as the curved member specifically illustrated in Figures 1 and 2. In any case, the bar or strip will bend or curl when subjected to temperature change because of the unequal expansion of the metals.

The variable-area type injection nozzle developed prior to my invention was substantially the structure illustrated except for the structure relating to collar-guide 29, temperature sensitive element 36, and the association of these elements with spring 34 and bellows 27. The prior valve provides for delivery of fuel from conduits 19 into chamber 14 at a substantially constant fuel pressure by means of pressure sensitive bellows 27 augmented by spring 34. In the operation of that valve, bellows 27 in response to an increase in fuel pressure necessitated by an increased fuel requirement, contracts causing piston 23 to rise in chamber 14. In this manner, dependent on the amount of fuel required for delivery into chamber 14, piston 23 is raised to permit the availability of a larger number of conduits 17 to maintain a substantially constant fuel pressure, or pressure drop across conduits 17, thereby providing for satisfactory atomization of fuel under selected operating conditions. Prior to the development of the variable-area nozzle, it was found that in a single or a plurality of fixed fuel inlets such as 17, the high fuel pressure required to deliver increased amounts of fuel was responsible for too high a degree of atomization, and the low fuel pressure required for delivery of relatively small amounts of fuel, was responsible for too low a degree of atomization, in either case causing combustion instability. As described, the variable-area injection nozzle prior to my invention operates satisfactorily so long as the viscosity of the fuel in conduits 18 and 19 is substantially constant. However, when viscosity of the fuel varies, as for example when it increases, a higher pressure drop is required across fuel inlets 17 in order to achieve satisfactory atomization than is permitted by bellows 27 and spring 34 alone, operating in conjunction with piston 23. As a result, when fuel viscosity increases, particularly as a result of a temperature change in the fuel of from 20 to 125° F. and in some cases higher, atomization as a result of such a change is not satisfactory. In the improved variable-area fuel nozzle of my invention, I have provided temperature sensitive element 36, collar-guide 29, and the like as described to respond to any viscosity change in fuel in conduits 18, manifest by the change in temperature of the fuel therein, and to accordingly operate in conjunction with bellows assembly 27 so as to provide the increase in pressure drop required by the increased liquid fuel viscosity, against the otherwise normal action of bellows 27 and spring 34 to prevent such an increase from taking place. Accordingly, temperature sensitive element 36 in response to a decrease in temperature, i. e., an increase in viscosity, contracts causing collar-guide 29 to move against spring 34, thereby lowering the position of piston 23 in chamber 14 to an extent to provide fewer openings 17 resulting in the increased pressure drop necessary for maintaining the desired atomization of the higher viscosity fuel. Conversely, in response to an increase in temperature, i. e., a decrease in viscosity of the fuel in conduits 18, the fuel pressure is restored to the original or decreased further dependent on the extent of viscosity change encountered. It is within the intended scope of my invention to provide for the use of any suitable temperature sensitive means which can be adapted to cause piston 23 to rise or be lowered in chamber 14 in response to viscosity change of fuel in conduits 18, manifest by a change in fuel temperature.

Figure 4 represents another embodiment of this invention wherein there is provided a fluid-filled capsule which is responsive to variations in fuel temperature, and therefore viscosity, and wherein the temperature-sensitive response is transmitted to the fuel-pressure-responsive piston by means of novel lever means which provides the desired force and mechanical effectiveness.

According to Figure 4, fluid-filled expansible capsule 50 is positioned within housing 10, only the upper part of which is shown, the remainder of the apparatus being as shown in Figure 1. Capsule 10 is constructed of materials known in the art and is filled with a fluid such as ethyl alcohol. Capsule 50 can be brazed or otherwise attached to closure 13, so that changes in fuel temperature are transmitted through the metal of housing 10 and closure 13 directly to the fluid in capsule 50. Attached to capsule 50 is extension 59 to which are pivotally attached two lever arms 53 by means of bolt or pin 54 and elongated slots 55. Supports 51 are attached to closure 13 and provide a fulcrum at 52 for each of lever arms 53. The opposite ends of lever arms 53 are pivotally attached to extensions 57 on collar-guide 29 at 56 by means of elongated slots 58.

An increase in fuel temperature causes extension 59 to push the lever arms 53 at 54 which pull collar-guide 29 at points 56, thus causing piston 23 (Figure 1) to uncover additional area of ports 17. A decrease in fuel temperature results in the opposite action, i. e. a covering of some of ports 17 by piston 23.

Figure 5 illustrates a further embodiment of this invention wherein pressure drop through a fuel passageway is controlled in response to altitude of a jet aircraft utilizing a fuel nozzle of the type described.

According to Figure 5, shaft 67 extends through closure 13 and is longitudinally movable therein. Shaft 67 has flattened end 68 which is pivotally attached to a pair of lever arms 71 at 69 through elongated slots 70. Projections 76, attached to housing 10 provides fulcrums 75. Lever arms 71 are pivotally attached, at 73, through slots 72, to extensions 74 attached to collar guide 29.

Indicated generally at 60, is a battery circuit or A. C. circuit including variable resistance or impedance 61. Aneroid means 63, exposed to the atmosphere, is operatively connected to contact 62 of variable resistance 61 by means of rod 64. Operatively connected to resistance 61, is amplifying means 65, which can be of any desired construction known in the art. Operatively connected to amplifying means 65 is servo means 66, of any desired type known in the art. Servo means 66 is operatively connected to shaft 67. The internal structure and arrangement of amplifying means 65 and servo means 66 are well known in the art and do not, per se, constitute a feature of this invention.

According to Figure 5, an increase in altitude, and consequently in fuel temperature and viscosity, causes aneroid means 63 to expand, moving contact 62 downwardly (in the drawing), thus causing a change in the signal transmitted to amplifying means 65. The amplified signal is transmitted to servo means 66, which converts it to mechanical motion. The mechanical motion is transmitted to shaft 67, which is thus caused to push lever arms 71 at 69. This action causes collar guide 29 to move piston 23 (Figure 1) and cover some of the parts 17. A decrease in altitude has the opposite effect.

When the outside of closure 13 is exposed to fuel pressure, shaft 67 can extend through a packing gland, not shown, in closure 13 to prevent leakage of fuel through closure 13.

While certain structures, process steps, and examples have been described for purposes of illustration, the invention is not limited thereto. Variation and modification within the scope of the disclosure and the claims will be apparent to those skilled in the art. For example, the fluid-filled capsule shown in Figure 4 can be immersed in the fuel and its expansion and contraction can be transmitted to a shaft such as shaft 67 in Figure 5 and subsequently to collar-guide 29 by a system of levers of the type shown in Figure 4. Also, in an apparatus of the type shown in Figure 5, rod 64 can be connected to contact 62 through a system of levers adapted to increase the amplitude of motion transmitted to contact 62. Furthermore such a system of levers can be connected directly to shaft 67 and the electrical circuit eliminated. In addition, the viscosity-compensating action can be effected manually, as by means of a cable and/or adjustment screw connected, for example to collar guide 29, adjustment being made in response to fuel temperature as read from thermometric means.

From the foregoing, it is evident that the basic concept of this invention lies in a method comprising controlling pressure drop through a fuel spray nozzle in response to a change in fuel viscosity and in novel apparatus for effecting such control. The invention is particularly useful in connection with a method or apparatus wherein the pressure drop is concomitantly controlled in response to variations in fuel pressure, and it will be understood by those skilled in the art that, in such an application the pressure-responsive adjustment can be greater or less than the viscosity-responsive adjustment under a given set of conditions.

I claim:

1. In a housed, variable-area fuel injection nozzle of the vortex type, including liquid fuel inlet conduit means to a nozzle housing and fuel-pressure-sensitive means to vary available area of a passageway for admitting liquid fuel from said inlet conduit means into a vortex chamber in response to liquid fuel inlet pressure, so as to control pressure drop through said passageway, thereby providing a predetermined degree of fuel atomization the improvement which comprises, in combination: temperature-sensitive means responsive to change in the temperature of said fuel; lever means operatively connected at one end thereof to said temperature-sensitive means; said lever means having fulcrum means attached to said housing and being operatively connected to said pressure-sensitive means so as to increase said pressure drop when said temperature decreases and decrease said pressure drop when said temperature increases.

2. The improvement according to claim 1 wherein said fuel-temperature-responsive means is a fluid-filled expansible capsule.

References Cited in the file of this patent

UNITED STATES PATENTS

| | | |
|---|---|---|
| 1,813,122 | Moore | July 7, 1931 |
| 2,513,720 | Hallinan | July 4, 1950 |
| 2,579,215 | Nuyl | Dec. 18, 1951 |
| 2,629,225 | Ammann | Feb. 24, 1953 |
| 2,644,513 | Mock | July 7, 1953 |
| 2,661,243 | Fox | Dec. 1, 1953 |
| 2,667,918 | Ifield | Feb. 2, 1954 |

FOREIGN PATENTS

| | | |
|---|---|---|
| 581,367 | Great Britain | Oct. 10, 1946 |